E. G. CLARK.
MACHINE FOR APPLYING EXPRESSION INDICATING LINES AND THE LIKE TO PERFORATED NOTE SHEETS.
APPLICATION FILED JUNE 4, 1914.

1,137,259.

Patented Apr. 27, 1915.
7 SHEETS—SHEET 1.

Fig. 1.

Witnesses:
Inventor
Ernest G. Clark
by Burton Burton
his attys.

E. G. CLARK.
MACHINE FOR APPLYING EXPRESSION INDICATING LINES AND THE LIKE TO PERFORATED NOTE SHEETS.
APPLICATION FILED JUNE 4, 1914.

1,137,259.

Patented Apr. 27, 1915.
7 SHEETS—SHEET 3.

Fig. 4.

Witnesses

Inventor
Ernest G. Clark.
by Burton & Burton
his Atty's

E. G. CLARK.
MACHINE FOR APPLYING EXPRESSION INDICATING LINES AND THE LIKE TO PERFORATED NOTE SHEETS.
APPLICATION FILED JUNE 4, 1914.

1,137,259.

Patented Apr. 27, 1915.

Witnesses:

Inventor
Ernest G. Clark
by Burton & Burton
his Attys

UNITED STATES PATENT OFFICE.

ERNEST G. CLARK, OF DE KALB, ILLINOIS, ASSIGNOR TO MELVILLE CLARK PIANO COMPANY, OF CHICAGO, ILLINOIS, A CORPORATION OF ILLINOIS.

MACHINE FOR APPLYING EXPRESSION-INDICATING LINES AND THE LIKE TO PERFORATED NOTE-SHEETS.

1,137,259.     Specification of Letters Patent.     Patented Apr. 27, 1915.

Application filed June 4, 1914. Serial No. 842,843.

*To all whom it may concern:*

Be it known that I, ERNEST G. CLARK, a citizen of the United States, residing at De Kalb, in the county of Dekalb and State of Illinois, have invented new and useful Improvements in Machines for Applying Expression-Indicating Lines and the like to Perforated Note-Sheets, of which the following is a specification, reference being had to the accompanying drawings, forming a part thereof.

The purpose of this invention is to provide an improved mechanism for applying to perforated note sheets, designed to be used as controllers for automatic playing mechanisms, lines extending in zig-zag or sinuous fashion longitudinally of the sheet for indicating the variations of tempo or dynamic expression of the music corresponding to the movements of the stops for controlling expression and tempo.

It consists in the elements and features of construction shown and described, as indicated in the claims.

The machine illustrated in the drawings is intended to provide means for marking a multiplicity of note sheets all at one time by following a single pattern note sheet, and for this purpose it comprises a frame indicated by a sill, 1, top bars, 3 and 37, and uprights, 2, 8, 12 and 12ª, in which frame are mounted a multiplicity of sheet-marking units. Each of these units comprises a take-up roll, 4, a spool live center, 5, and a platen roll, 6, positioned intermediate the take-up roll and the spool live center, all three of said elements having their axes parallel. Opposite each spool live-center, alined therewith, is the spool dead-center, 7. These marking units are shown grouped in two tiers or columns, any desired number,— as illustrated, six,—being placed in each column and the two columns being positioned with the axes of the several members of the units in each column alined with corresponding members of units in the other column. It will be obvious that the number of columns which may comprise the entire machine is not limited to two, but whatever the number of columns, the alinement of the elements in each column with corresponding elements in the other columns is desirable for reasons which will be obvious as the description of the construction proceeds. In the left hand column, description of which will answer for both columns, the platen rolls, 6, have journal bearings for their shafts, 6ª, mounted on the uprights, 2 and 8, of the frame. Each of the platen rolls is surfaced with mark-producing material, such as carbon paper or ribbon, 9, for producing a mark upon the surface of the note sheet which faces the platen roll when pressed by a stylus upon the opposite side, as hereinafter explained.

For the spools, 10, which are adapted to be connected for rotation with the live-centers, 5, by means of the chuck sockets, 11, of the spools, there are mounted in the upright, 12, of the frame, the dead centers, 7, above mentioned, said dead centers being mounted for yielding longitudinally to admit the spools, and for pressing against them to retain them by springs, 13, which operate in a manner obvious without further description. For journaling the live center shafts, 5, and for other purposes, the upright, 2, has metal facing plates, 2ª, 2ª, extending longitudinally along the front and rear margins, and 2ᵇ and 2ᶜ, extending transversely at the top and bottom. Each of the live-center shafts, 5, has rigid with it a gear, 15, at the opposite side of the upright, 2, and face plate, 2ª, from that at which the spools are engaged by the driving terminals of the live centers. On the lowest of the live-centers in each column there is, in addition to the gear, 15, another gear, 17, which meshes with an idler, 18, journaled on the frame, and which in turn meshes with a gear, 19, on the main power shaft 19ª, which is mounted for sliding in its journal bearings on the frame to carry said gear, 19, into and out of mesh with the idler, 18. On a shiftable carrier, 20, there are mounted idler gears, 21, adapted to mesh with the gears, 15, on the consecutive spool live-centers, and thereby to unite them in a continuous train extending from the idler, 18, to the topmost of the spool live-centers. The carrier, 20, being movable laterally with respect to the axes of the idlers, 21, and the gears, 15, said idlers may be taken out of mesh with said gears, thereby disconnecting the train when desired. Mounted fast on the shafts, 4ª, of the take-up rolls, 4, there are equal gears, 22, which are adapted to be connected in a continuous train by the idlers, 21, when the carrier, 20, is moved laterally to bring said idlers, 21, into mesh between the consecutive gears, 22, on the take-up roll shafts. To adapt the carrier, 20, to be moved for carrying the idlers, 21, alternatively into mesh with the gears, 15, or into mesh with the gears, 22, said carrier consists of a bar having at the upper and lower ends clasps, 20ª and 20ᵇ, engaging the transverse facing bars, 2ᵇ and 2ᶜ, respectively, of the upright, 2. To these same facing plates and to the upright, 2, there are bolted the yokes, 26, 26, in which there is journaled a vertical rock shaft, 26ª, having lever arms, 26ᵇ, whose outer terminals, 26ᶜ, engage forks, 20ᶜ, 20ᶜ, on the bar, 20, for sliding the bar on the transverse bars, 2ᵇ and 2ᶜ, when the shaft, 26ª, is rocked. For rocking this shaft it has a lever arm, 26ᵈ, at the upper end, and for locking it in the two positions to which it is to be adjusted, there are connected to the vertical bar, 20, two latches, 27 and 28, each having two notches, 27ª and 28ª, the notches, 27ª, being positioned for engaging pins, 29, on the rear frame bar, 2ª, when the carrier is in position for putting the idlers into mesh with the gears, 15, on the spool live-centers, and the notches, 28ª, being in position for engaging said pins when the idler carrier is shifted for engaging the idlers with the gears, 22, on the take-up roll shafts. On the lowest of the take-up roll shafts there is in addition to the gear, 22, a gear, 30, which is adapted to mesh with the gear, 19, on the main power shaft when said shaft is shifted to carry the gear, 19, laterally in the opposite direction from that in which it is moved to put the gear, 19, into mesh with the idler, 18. The vertical planes of the two gears, 18 and 30, are sufficiently separated along the line of the main power shaft, 19ª, so that the gear, 19, may stand between those planes out of mesh with both said gears. For shifting the main power shaft there is fulcrumed on the frame at 35, a shifting lever, 36, which extends up to the top of the frame protruding there-above, terminating in a handle, 36ª, in convenient position to be reached by the operator occupying a position for watching the pattern sheet as hereinafter explained. The lower end of the lever, 36, is forked for engagement between two stop collars, 19ᵇ, 19ᵇ, on the shaft, 19ª. The top bar, 37, of the frame has a notch, 37ª, positioned for lodgment of the lever, 36, therein when said lever stands at the position for holding the shaft, 19ª, thrust longitudinally to a position for engaging the gear, 19, with the idler, 18, of the spool live-center train, and another notch, 37ᵇ, at a position for similarly engaging said lever when it is moved to position for engaging the gear, 19, with the gear, 30. Intermediate these two notches there is a third notch, 37ᶜ, for engaging the lever when it is positioned for holding the gear, 19, at intermediate position between the planes of the two gears, 18 and 30, out of mesh with both said gears. A bar, 38, is held to the side of the bar, 37, by springs, 39, coiled about the supporting pins, 40, which connect to said bars, said spring-pressed bar, 38, being thus adapted to be pushed away from the notched bar when the lever, 36, is first sprung a little sideward in order to disengage it from one of the notches, and the spring-pressed bar thus operates to press the lever, 36, into either of the notches opposite to which it may be swung and to hold it against accidental disengagement from the notches, respectively.

In order to adapt the apparatus for use in marking note sheets of different widths, and consequently wound upon spools of different lengths, there is provided a live center coupling, or spacer, for each of the spool live centers, said spacers or couplings, 50, being all mounted in a vertical bar, 51, for whose foot there is provided a socket, consisting of a notched block 52 mounted on the sill, 1, of the frame, while for the head there is provided an engagement in the upper frame bar, 3. A cam lock, 53, is provided for securing the vertical bar, 51, at the foot, and a hook, 53ª, secures it at the top. Each of the spacers or couplings, 50, has one end provided with a chuck terminal, 11ª, corresponding to the spool socket, and the other end provided with a driving terminal, 50ª, for engaging the spools in the same manner as they are engaged by the spool live centers. The length of the spacers or the live-center-couplings, 50, is designed to be the difference between the lengths of two lengths of spools for which the structure is adapted. Any number of length of spools may be accommodated by thus providing corresponding spacers or live center couplings.

Figure 1:
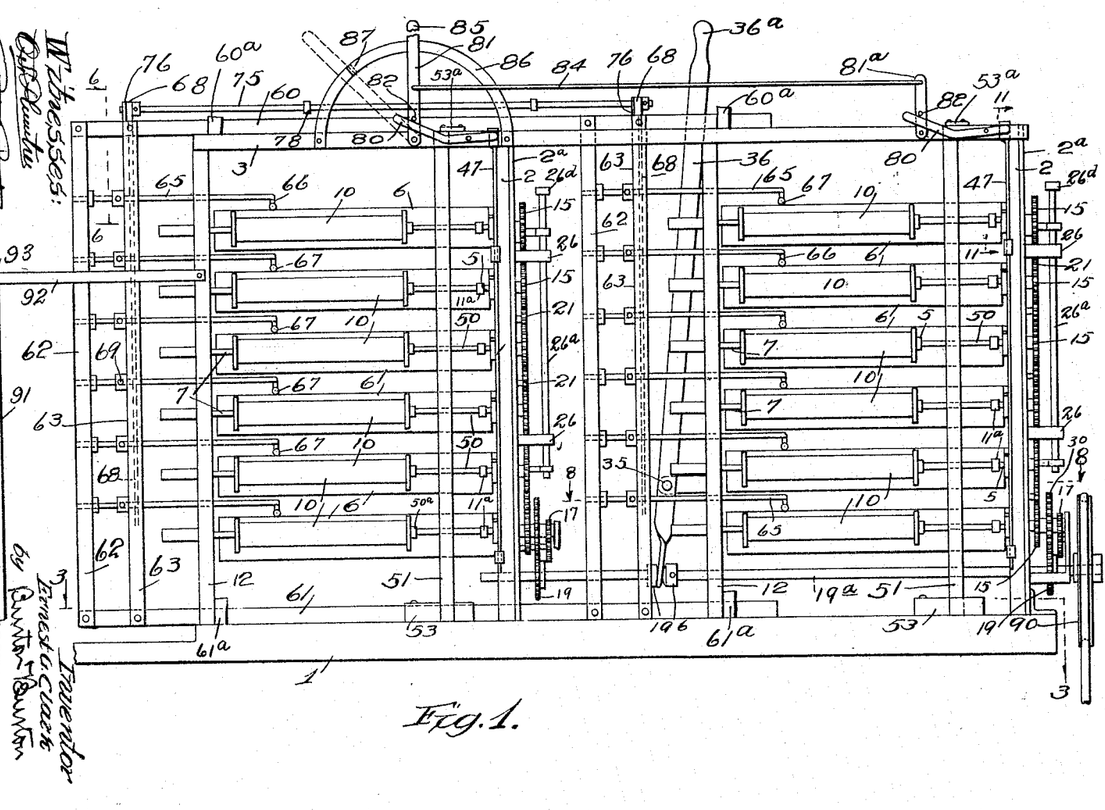
—Figure 1 is a front elevation of a machine embodying this invention.
Figure 2:
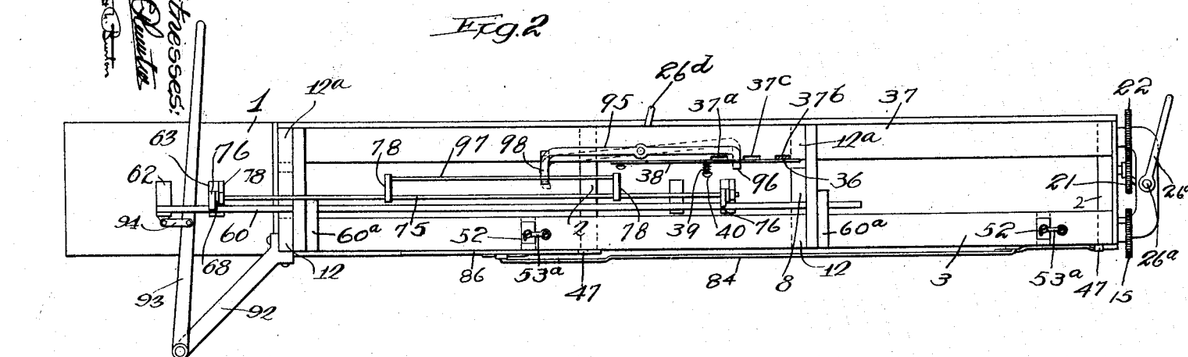
Fig. 2 is a top plan view.
Figure 3:
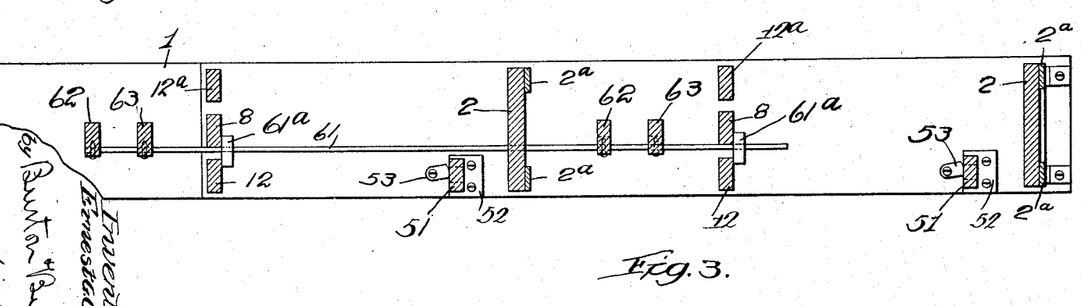
Fig. 3 is a section at the line 3—3 on Fig. 1.
Figure 4:
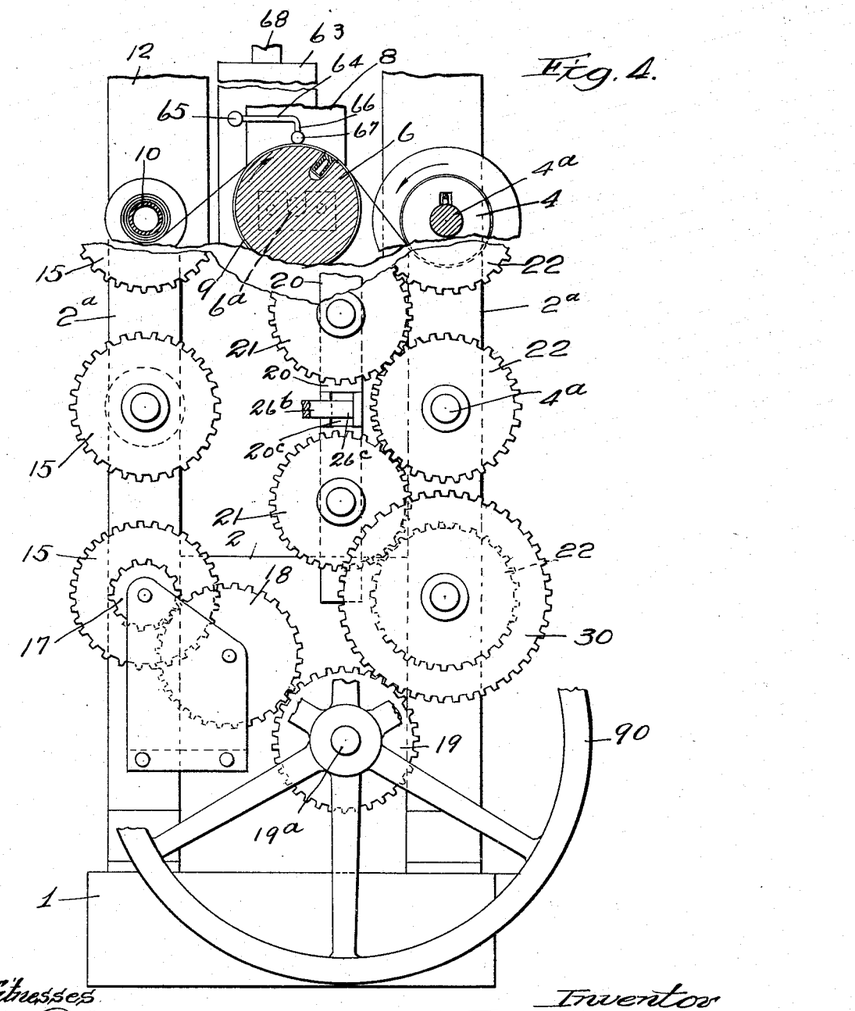
Fig. 4 is an elevation of a portion of the driving train.
Figure 5:
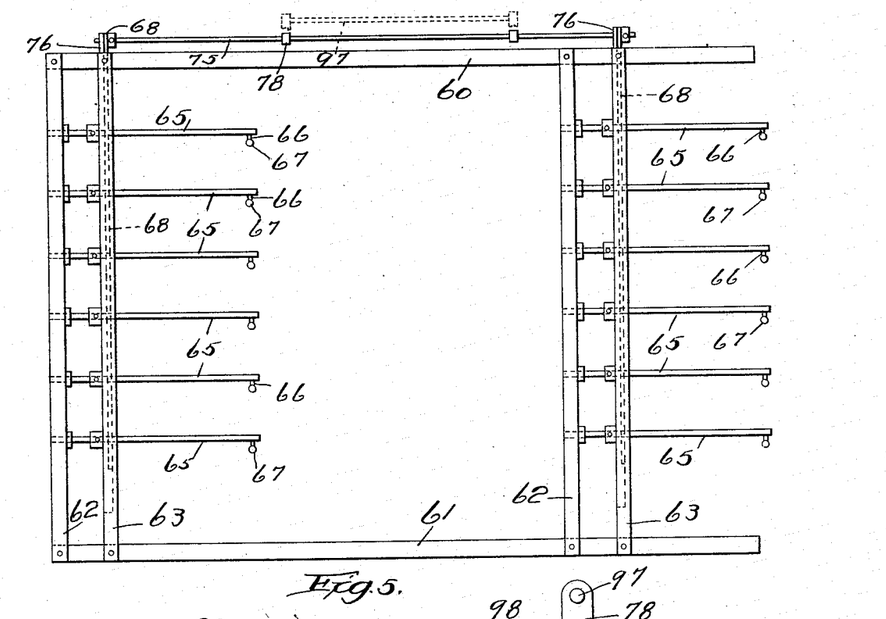
Fig. 5 is a front elevation of the stylus carrier frame.
Figures 6, 7:
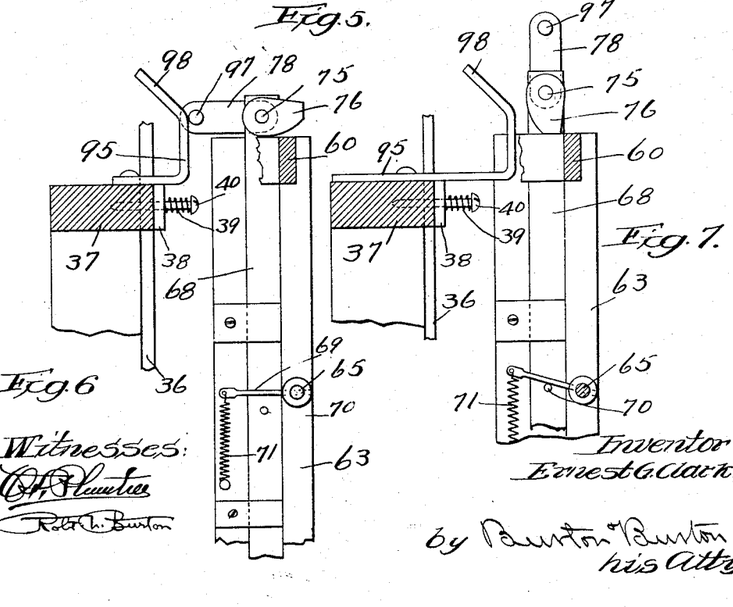
Fig. 6 is a section at the line 6—6 on Fig. 1.
Fig. 7 is a similar view showing the movable parts in a different position.

The marking of the note sheets in accordance with a pattern sheet is effected by means of styli bearing upon the outer surface of the note sheet,—that is, the surface next to the platen roll,—as it runs over the platen roll, producing a mark upon the inner side of the sheet. For the purpose of thus marking all the note sheets simultaneously there is provided a stylus-carrier consisting of a frame comprising upper and lower horizontal bars, 60, 61, and vertical bars, 62 and 63, connecting the horizontal bars near one end. In these vertical bars, 62 and 63, there are mounted stylus arms which are rods comprising a rock-shaft portion, 65, and a stylus lever arm, 64, (see Fig. 4) the shaft being journaled for rocking in the upright bars, 62 and 63, and extending parallel to the axes of the platen rolls inward past the proximate ends of said rolls so that the stylus lever arm, 64, offset from the rock shaft portion of each stylus arm overhangs one of the platen rolls, the end portion of said lever arm being bent down in a line radial to the platen roll and forming a stylus, 66, whose globular end, 67, bears upon the top of the platen roll or upon the note sheets running thereover. In the upright, 63, of the stylus-carrier, there is mounted for sliding vertically a flat bar, 68, the said bar being let into a longitudinal channel on the outer face of the upright, 63. The rock shaft, 65, of each stylus arm is provided with an operating lever arm, 69, projecting horizontally past the outer face of the slide bar, 68, and said slide bar has a pin, 70, projecting outwardly under each of said operating lever arms, 69, for engaging said lever arms when the slide bar is lifted; a spring, 71, connected at one end to the lever of each lever arm, 69, and at the other end to the upright bar, 63, operates to hold the lever arm, 69, down against the pin, 70, so that the lever arm, 69, follows the up-and-down movement of the slide bar, 68, being actuated in one direction by the pin and in the other direction by the spring. The slide bar, 68, projects above the upper end of the upright, 63, and its upper end affords journal bearing for a rock shaft, 75, which carries rigidly adjacent to the slide bar, 68, an eccentric cam, 76, whose eccentric edge bears upon the upper edge of the upright, 63, or upon the horizontal top bar, 60, of the stylus-carrier which is joined to said upright at the end of the latter, and thereby the rocking of the shaft, 75, which is effected by a hand lever, 78, reciprocates the slide bar, 68, and oscillates the stylus arms, rocking the shafts, 65, in their bearings and moving the styli toward and from the platen rolls respectively.

For adapting the stylus carrier frame to slide in the main frame the lower horizontal bar, 61, is provided with slide bearings, 61ª, 61ª, on the top of the sill, 1, and the upper bar, 60, of said carrier is similarly provided with slide bearings, 60ª, 60ª, on the top of the bar, 3.

To afford a convenient means of operating the stylus carrier frame, a post, 91, is provided extending up from the floor, said post being braced in position by a bracket, 92, which extends out from the upright, 12; and upon the upper end of this post there is fulcrumed a lever, 93, which extends across the top of the machine into convenient reach of the operator standing behind the same, and is connected by a link, 94, with the upright, 62, of the stylus carrier, so that the operator moving the handle end of said lever, 93, to the right or left, correspondingly moves the stylus carrier.

Figure 8:
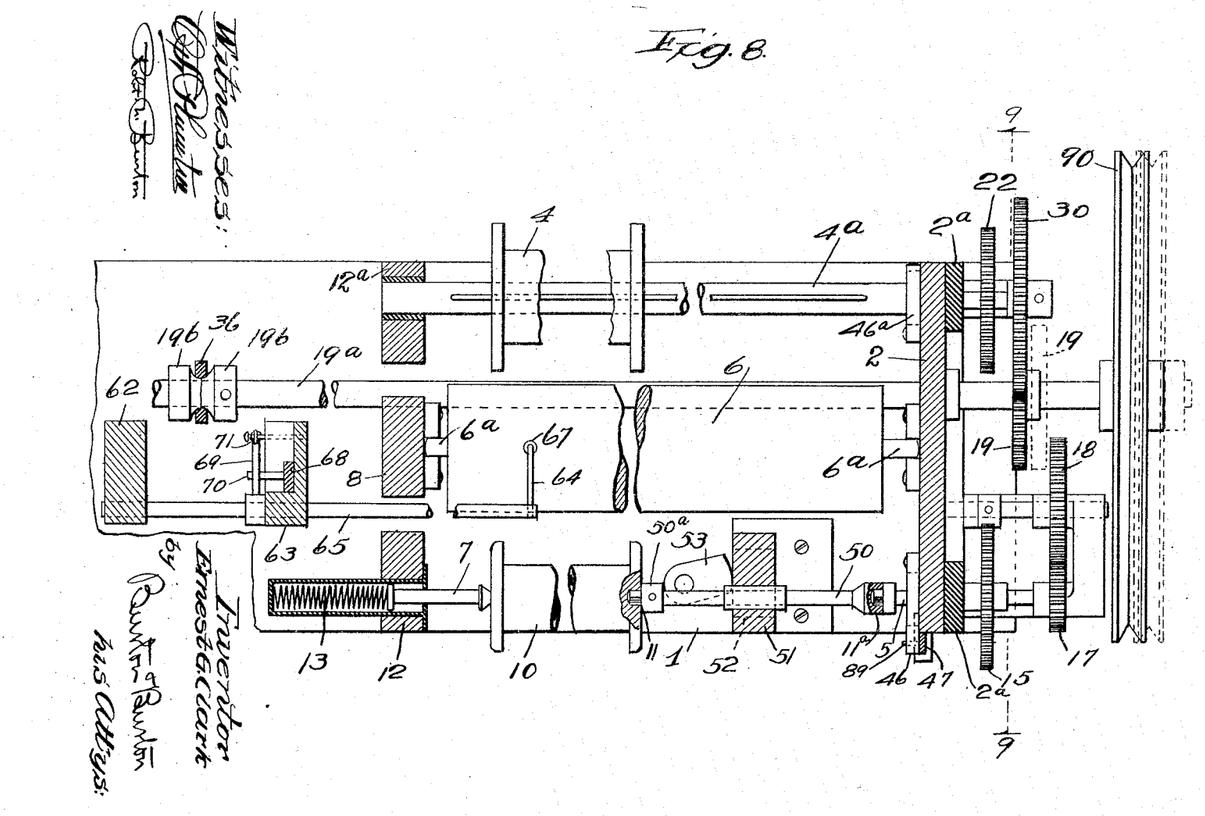
Fig. 8 is a section at the line 8—8 on Fig. 1.
Figures 9, 10, 11, 12:
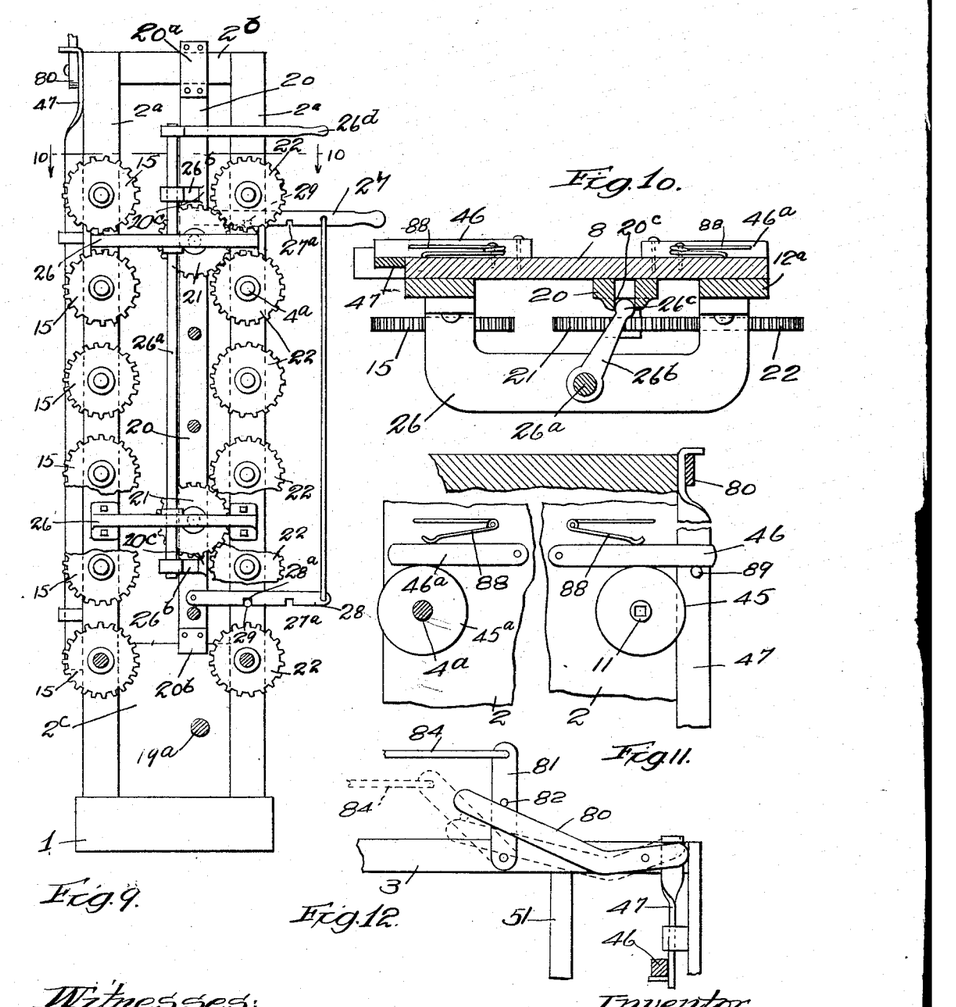
Fig. 9 is a section at the line 9—9 on Fig. 8.
Fig. 10 is a section at the line 10—10, on Fig. 9.
Fig. 11 is a detail section at the line 11—11 on Fig. 1.
Fig. 12 is a detail elevation of brake-actuating devices.
Figure 13:
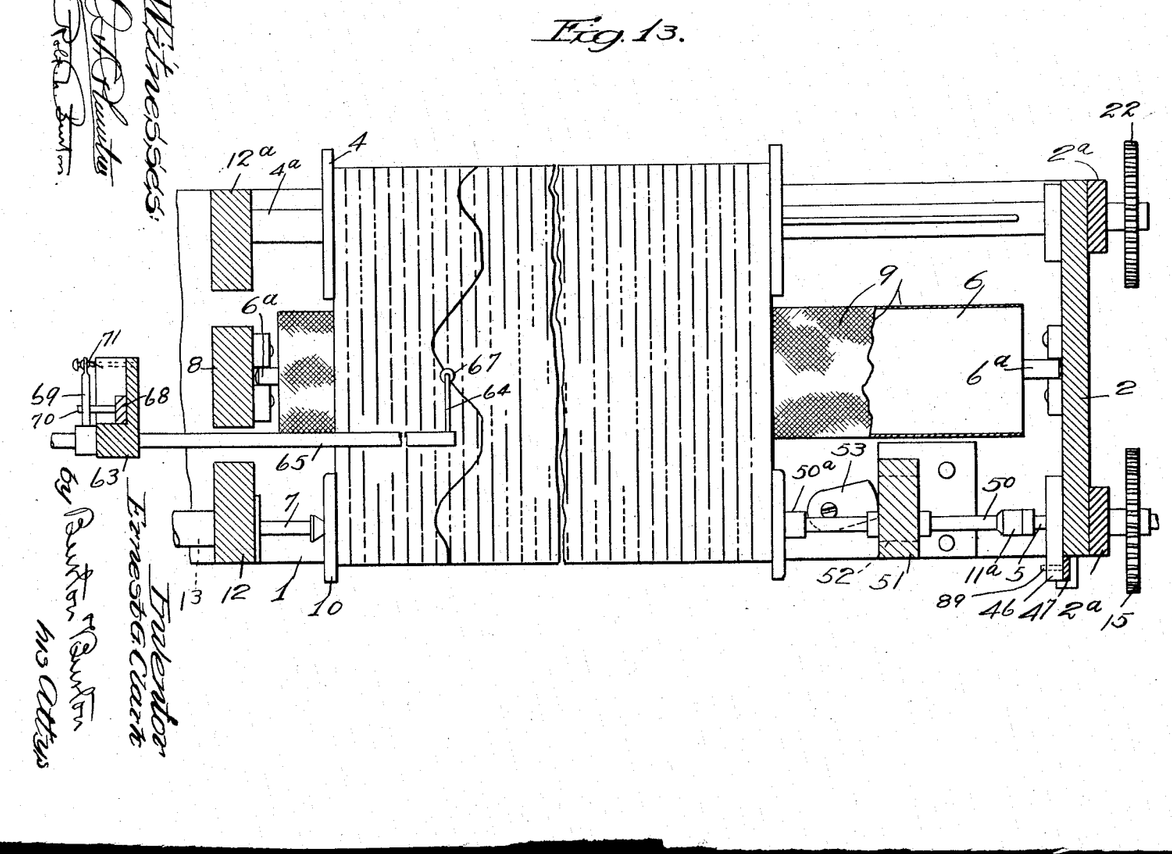
Fig. 13 is a detail plan view of a portion of one marking unit with the pattern sheet thereon.

The operation of this structure will now be described: The operator first mounts in the upper marking unit of the left-hand stack or column a pattern note sheet, that is, one which has upon it the marks to be reproduced on the other note sheets, and in each of the other marking units there is mounted a note sheet to be marked. By mounting the note sheets, it will be understood, that the spools containing the note sheets are mounted on the spool centers, respectively, the end portions of the note sheets being drawn over the trackers and connected with the take-up rolls. The mounting of the note sheets will be done while the mechanism is at rest by reason of the gear, 19, being at the dotted-line position shown in Fig. 8, engaging neither with the gear, 18, nor the gear, 30. The note sheets being placed in position as described, the operator by means of the lever, 36ª, shifts the shaft, 19ª, to engage the gear, 19, with the take-up roll train, causing all the take-up rolls to operate for winding the note sheets off the spools and drawing them over the platen rolls. As the note sheets advance over the platens, the operator taking hold of the operating lever, 93, or any convenient part of the stylus carrier, moves it back and forth to carry the styli transversely of the travel of the note sheets, as may be necessary to keep the stylus on the pattern sheet following the pattern line thereon. This causes not only the pattern sheet itself, but all the other note sheets passing over their respective platen rolls, to have produced upon their outer or under side the fac-simile of the mark originally placed upon the inner or upper side of the pattern sheet, and which is thus traced by the stylus of the first unit.

In order that a fresh portion of the surface of the carbon sheet or ribbon which forms the marking surface of the platen rolls, should be constantly brought under the stylus, it is necessary that the platen roll should roll as the note sheets are drawn over them, and in order that such rolling should be affected by the traction of the note sheets themselves, the latter must be held stretched taut over the platen rolls. To insure this is the purpose of the brake disks, 45, rigid with the spool live centers and brake shoes, 46, coöperating therewith, which are pivoted on the uprights, 2, and pressed against the disks, by springs, 88, and lifted by pins, 89, carried by the brake slide bars, 47, mounted for sliding vertically on the main frame. In order that these brake devices may be operative upon the spools carried by the live spool centers so as to cause the note sheets to be drawn taut over the platen rolls, there are provided levers, 80, 80, fuclrumed upon the upper horizontal bar, 3, of the frame and connected respectively one with each of the brake bars 47; and also fulcrumed on said upper bar there are levers, 81, 81ª, having pins, 82, projecting from their faces over the edges of the levers, 80, 80, respectively, for actuating said levers, 80, as the levers, 81, 81ª, are rocked. The two levers, 81, 81ª, are connected by a link, 84, so that either one of them being manipulated will cause the other to be actuated so that the brake apparatus of both columns will be similarly operated. Preferably one of the levers, as 81, is elongated to form a handle, 85, which swings alongside of a segment, 86, having a shoulder, 87, with which the lever, 81, becomes engaged at the position at which the brake shoes, 46, are held out of contact with the brake disks, 45, on the spool live centers.

When the note sheets have been fully wound onto the take-up roll to the limit necessary to completely trace the pattern line to be reproduced, the operator shifts the lever, 36, to intermediate position where it engages the notch, 37ᶜ, of the bar, 37, thus disengaging the take-up roll driving train from the driving power. The operator will next shift the idler carrier, 20, to engage the idlers with the spool live center train. It is obviously important that the styli should be withdrawn from the note sheets before the rewinding of the note sheets onto the spools, because otherwise there would be produced on the sheets a meaningless mark during the re-winding. To insure that the spool-driving train shall not be connected with the driving power until the styli shall be lifted, there is pivoted upon the upper side of the frame bar, 3, a latch, 95, having a tooth, 96, projecting crosswise of the path of swing of the lever, 36, and adapted to obstruct that path to prevent the lever from being moved from the notch, 37ᶜ, at which the driving gear, 19, is in neutral position to the notch, 37ª, at which said gear would be engaged with the spool-driving train. The rock shaft, 75, has two lever arms, 78, connected by a wrist member, 97 extending parallel with the rock shaft which is positioned for encountering a cam arm, 98, which extends from the latch, 95, when the shaft, 75, is rocked for advancing the styli against the platen rolls for marking, and in this movement said arm of the rock shaft, 75, moves the latch into locking position described, where it is securely held until the operator rocks the shaft, 75, for withdrawing the styli from the platen rolls, and when this is done the operator may complete the swing of the lever, 36, over to reach the notch, 37ª, for engaging the gear, 19, with the spool live center driving train, causing the note sheets to be rewound from the take-up rolls back onto the spools. In order that the rewinding may be effected rapidly, the gear trains being constructed for this purpose, the operator will engage the lever, 85, with the shoulder, 87, of the segment, 86, having swung said lever over into position for lifting the brake shoes away from the brake disks by means of the pins, 89, and against the resistance of the springs, 88.

The take-up roll shafts are each provided with a brake disk, 45ª, and a brake bar, 46ª, pivoted on the upright, 2, and pressed by a spring, 88, is uninterruptedly operative to check the rotation of the take-up roll, this being desirable both in winding and unwinding, and no means is therefore provided for releasing the pressure of these brake bars, 46ª, at any stage of the operation.

I claim:—

1. In a machine for the purpose indicated, in combination with a frame, a multiplicity of sheet-marking units mounted in the frame, each comprising a platen roll having a mark-producing surface; a take-up roll having its axis parallel with that of the platen roll and spool centers also parallel to said axis; means for rotating the take-up rolls; a stylus carrier having a stylus arm for each platen roll; styli thereon overhanging the platen rolls respectively; means for pressing the styli yieldingly against their respective platen rolls, and means for moving the carrier bodily to carry all the styli longitudinally of the platens during the actuation of the take-up roll.

2. In a machine for the purpose indicated, in combination with a frame, a multiplicity of sheet-marking units mounted in the frame, each such unit comprising a platen, a take-up roll and spool centers, live and dead, said spool centers having their axes parallel to that of the take-up roll; a gear train in which the spool live centers are operatively connected for rotation; another gear train in which the take-up roll shafts are operatively connected for rotation; a power-communicating wheel and means for shifting its connection from the initial gear of one of said trains to the initial gear of the other train, said two trains comprising idler gears between each two consecutive operative gears, said idlers for the two trains being the same; a frame upon which said idlers are mounted and means for shifting it to engage said idlers alternatively with the two trains.

3. In a machine for the purpose indicated, in combination with a frame, a multiplicity of sheet-marking units mounted in the frame, each such unit comprising a platen, a take-up roll and spool centers, live and dead, having their axis parallel with that of the take-up roll; a spacing spindle for each spool live center, and a support upon which all said spacing spindles are mounted, such spacing spindles being adapted at one end to engage the live center, and having at the other end means for engagement similar to that of the live centers, the frame being provided with means for positioning said spindle support removably with the spindles alined with the live centers and engaged therewith respectively.

4. A machine for the purpose indicated, comprising, in combination with a frame, a multiplicity of sheet-marking units mounted in the frame, each such unit comprising a platen, a take-up roll and spool live and dead centers having their axis parallel to that of the take-up roll, such units being comprised in a plurality of columns or vertical series, the several elements of the units of each series being axially alined with corresponding elements of like units of the remaining series; a stylus carrier mounted for sliding on the frame parallel to the axes of the take-up roll and spool centers; stylus arms mounted on said carrier, styli on said stylus arms overhanging the platens respectively; means for moving the stylus carrier at will parallel to said axes during the rotation of the take-up roll, and means for actuating the stylus arms to advance the styli toward and retract them from the platens respectively.

5. In a machine for the purpose indicated, in combination with a frame, a multiplicity of sheet-marking units mounted in the frame, each such unit comprising a platen, a take-up roll and spool live and dead centers having their axis parallel to that of the take-up roll; means for rotating the take-up roll; a stylus carrier mounted on the frame having a stylus arm for each platen, and styli thereon overhanging the platens respectively; means for moving the stylus frame to carry the styli longitudinally of the respective platens during the actuation of the take-up roll; means for operating the stylus arms to advance the styli toward and retract them from the platens respectively; means for actuating the spool live centers when the platen rolls are relieved from actuation; means for shifting the driving connections from the platen rolls to the spool live centers, and connections between said shifting means and the stylus-arm-operating means for locking the stylus arms at position for holding the styli retracted from the platens when the spool live centers are actuated.

6. In a machine for the purpose indicated, in combination with a frame, a multiplicity of sheet-marking units mounted in the frame, each comprising a platen roll, a take-up roll having its axis parallel with that of the platen roll and spool centers also parallel with said axis; means for rotating the take-up rolls, each of the spool live centers having a brake disk, brakes coöperating with said disk respectively; means for applying the brakes to the disks during the actuation of the take-up roll; a stylus-carrier having a stylus arm for each platen roll, and styli thereon overhanging the platens respectively; and means for yieldingly pressing the styli against the platen rolls.

7. In a machine for the purpose indicated, in combination with a frame, a multiplicity of sheet-marking units mounted in the frame, each comprising a platen roll, a take-up roll having its axis parallel with that of the platen roll and a live spool center also parallel to said axis; means for rotating the spool live centers; a stylus carrier having a stylus arm for each platen roll; styli thereon overhanging the platen rolls respectively; means for pressing the styli yieldingly against the platen rolls; means for moving the stylus-carrier bodily to carry all the styli longitudinally of the platen rolls during the actuation of the take-up roll; each spool live center having a brake disk; brakes coöperating with the disks respectively, and means for operating the brakes to withdraw them from the disks when the spool live centers are actuated.

8. In a machine for the purpose indicated, in combination with a frame, a multiplicity of sheet-marking units mounted in the frame, each comprising a platen roll, a take-up roll having its axis parallel with that of the platen roll, and a spool live center also parallel to said axis; a gear train by which the spool live centers are actuated, and a gear train by which the take-up roll shifts are actuated, said two trains comprising idler gears in common and a frame on which the idler gears are carried mounted for movement to connect said idler gears alternatively with the two trains.

9. In a machine for the purpose indicated, in combination with a frame, a multiplicity of sheet-marking units mounted in the frame, each comprising a platen roll, a take-up roll having its axis parallel with that of the platen roll, and a spool live center also parallel to said axis; a gear train by which the spool live centers are actuated, and a gear train by which the take-up roll shifts are actuated, said two trains comprising idler gears in common and a frame on which the idler gears are carried mounted for movement to connect said idler gears alternatively with the two trains; a power-communicating, rotating member mounted for movement into operative connection with the initial members of said trains alternatively, and means for moving said power-communicating member to shift its connection from one train to the other.

10. A machine for the purpose indicated, in combination with a frame, a multiplicity of sheet-marking units mounted in the frame, each comprising a platen roll, a take-up roll having its axis parallel to that of the platen roll, and a live spool center also parallel to said axis; means for alternatively rotating the take-up rolls and the spool live centers; a stylus-carrier having a stylus arm for each roll and styli thereon overhanging the platen rolls respectively, and means for moving the carrier bodily to carry all the styli longitudinally of the platen rolls during the actuation of the take-up roll; means for withdrawing the styli from the platen rolls; a device for shifting the driving connection from the take-up rolls to the spool live centers; locking means to prevent the movement of said device for such shifting, and connections from the means for withdrawing the styli to said locking means for unlocking the latter by the withdrawal of the styli.

11. In a machine for the purpose indicated, in combination with a frame, a multiplicity of sheet-marking units mounted in the frame, each comprising a platen, a take-up roll, and a live spool center parallel to the axis of the take-up roll; means for alternatively rotating the take-up rolls and the spool live centers; a stylus-carrier having a stylus arm for each platen and styli thereon overhanging the platens respectively; a device for shifting the driving connection into actuating relation to the spool live centers; means for locking said device to prevent such shifting; means controlling the styli for advancing them into operative relation with the platen, and connections from said means for moving said locking device into locking position.

12. In a machine for the purpose indicated, in combination with a frame, a multiplicity of sheet-marking units mounted in the frame, each comprising a platen, a take-up roll and a spool live center; means for alternatively actuating the take-up rolls and the spool live centers; a stylus-carrier consisting of a frame comprising vertical posts; stylus rock shafts journaled for rocking in the posts, each rock shaft having at one end a stylus-carrying lever arm and having proximate to the posts an operating lever arm; springs reacting upon said lever arms to yieldingly advance the styli to the platens; means for withdrawing the styli from the platens against the action of the springs comprising bars mounted for sliding on the posts respectively, and having pins for engaging the rock-shaft-operating lever arms, respectively; a rock shaft journaled in the upper ends of said slide bars and cams on the rock shaft operating against the posts for crowding the slide bars longitudinally when said last mentioned shaft is rocked.

13. In a machine for the purpose indicated, in combination with a frame, a multiplicity of sheet-marking units mounted in the frame, each comprising a platen, a take-up roll and a spool live center; means for alternatively actuating the take-up rolls and the spool live centers; a stylus-carrier consisting of a frame comprising vertical posts; stylus rock shafts journaled for rocking in the posts, each rock shaft having at one end a stylus-carrying lever arm and having proximate to the posts an operating lever arm; springs reacting upon said lever arms to yieldingly advance the styli to the platens; means for withdrawing the styli from the platens against the action of the springs comprising bars mounted for sliding on the posts respectively, and having pins for engaging the rock shaft operating lever arms, respectively; a rock shaft journaled in the upper ends of said slide bars and cams on the rock shaft operating against the posts for crowding the slide bars longitudinally when said last mentioned shaft is rocked; a device for shifting the driving connections into operative relation with the spool live centers; a lock for locking said device against such shifting, and connections from the last mentioned rock shaft for operating said lock to release the same when the shaft is rocked to withdraw the styli from the platen and to lock it when it is oppositely actuated.

14. In a machine for the purpose indicated, in combination with a frame, a multiplicity of sheet-marking units mounted on the frame, each comprising a platen; a take-up roll and a spool live center; means for alternatively actuating the take-up roll and the spool live center; said means comprising a shifting lever, a bar along which the lever is shifted having locking notches positioned respectively for holding it at take-up-roll-driving position, at spool-live-center-actuating position, and at an intermediate neutral position; a latch pivoted for swinging across the path of movement of the shifting lever to lock it against movement away from said intermediate position toward the spool-live-center-actuating position; a stylus carrier and stylus-carrying arms having styli thereon overhanging the platens respectively; said arms being movable to retract the styli from the platens; means for so moving them, and connections from said means to said latch for moving it out of said locking position when the styli are retracted, and into said locking position when the stylus-operating arms are moved in the opposite direction.

15. In a machine for the purpose indicated, in combination with a frame, a multiplicity of sheet-marking units mounted in the frame, each comprising a platen roll mounted for rotation about its axis and having a mark-producing surface; means for propelling the sheet to be marked thereover with pressure thereon for rotating the platen roll, the stylus-carrier having a stylus arm for each platen roll and styli positioned thereon for pressure upon the platen rolls, respectively; means for moving the carrier bodily to carry all the styli transversely of the direction of travel of the sheet during the operation of the sheet-propelling means in one direction, and means for withdrawing the styli from the platen roll during the actuation of the sheet in the opposite direction.

In testimony whereof I have hereunto set my hand at De Kalb, Illinois, this 17th day of April, 1914.

ERNEST G. CLARK.

Witnesses:
 H. B. SANFORD,
 M. L. FOHR.

Copies of this patent may be obtained for five cents each, by addressing the "Commissioner of Patents, Washington, D. C."